US011656876B2

United States Patent
Golla et al.

(10) Patent No.: US 11,656,876 B2
(45) Date of Patent: May 23, 2023

(54) REMOVAL OF DEPENDENT INSTRUCTIONS FROM AN EXECUTION PIPELINE

(71) Applicant: Western Digital Technologies, Inc., San Jose, CA (US)

(72) Inventors: Robert T. Golla, Austin, TX (US); Deepak Panwar, Austin, TX (US)

(73) Assignee: Cadence Design Systems, Inc., San Jose, CA (US)

(*) Notice: Subject to any disclaimer, the term of this patent is extended or adjusted under 35 U.S.C. 154(b) by 17 days.

(21) Appl. No.: 17/173,058

(22) Filed: Feb. 10, 2021

(65) Prior Publication Data

US 2022/0137976 A1    May 5, 2022

Related U.S. Application Data

(60) Provisional application No. 63/107,339, filed on Oct. 29, 2020.

(51) Int. Cl.
G06F 9/38       (2018.01)
G06F 12/06      (2006.01)
G06F 9/30       (2018.01)

(52) U.S. Cl.
CPC ........ *G06F 9/3838* (2013.01); *G06F 9/30043* (2013.01); *G06F 9/3867* (2013.01); *G06F 12/06* (2013.01)

(58) Field of Classification Search
CPC .................................................. G06F 9/3838
See application file for complete search history.

(56) References Cited

U.S. PATENT DOCUMENTS

| 6,098,166 | A  | * | 8/2000 | Leibholz | G06F 9/3824 |
| | | | | | 712/216 |
| 6,915,412 | B2 | | 7/2005 | Nguyen et al. | |
| 8,037,250 | B1 | * | 10/2011 | Barreh | G06F 12/0842 |
| | | | | | 711/125 |
| 8,640,129 | B2 | | 1/2014 | Cismas et al. | |
| 8,769,246 | B2 | | 7/2014 | Golla | |
| 2003/0061445 | A1 | * | 3/2003 | Birk | G06F 13/28 |
| | | | | | 711/158 |
| 2003/0208665 | A1 | * | 11/2003 | Peir | G06F 12/0859 |
| | | | | | 712/E9.05 |
| 2010/0332806 | A1 | * | 12/2010 | Golla | G06F 9/3838 |
| | | | | | 712/216 |
| 2011/0271057 | A1 | * | 11/2011 | Karlsson | G06F 12/0895 |
| | | | | | 711/E12.024 |
| 2017/0123794 | A1 | * | 5/2017 | Chen | G06F 9/3857 |

* cited by examiner

*Primary Examiner* — Michael J Metzger (74) *Attorney, Agent, or Firm* — Mark H. Whittenberger; Holland & Knight LLP (57) ABSTRACT

Techniques are disclosed relating to an apparatus, including a data storage circuit having a plurality of entries, and a load-store pipeline configured to allocate an entry in the data storage circuit in response to a determination that a first instruction includes an access to an external memory circuit. The apparatus further includes an execution pipeline configured to make a determination, while performing a second instruction and using the entry in the data storage circuit, that the second instruction uses a result of the first instruction, and cease performance of the second instruction in response to the determination.

20 Claims, 8 Drawing Sheets

```
┌─────────────────────────────────────────────────────────────┐
│ Receiving, by a load-store pipeline in a processor core, a  │
│ first instruction that includes a memory access.            │
│                          510                                │
└─────────────────────────────────────────────────────────────┘
                              ↓
┌─────────────────────────────────────────────────────────────┐
│ Receiving, by an execution pipeline in the processor core,  │
│ a second instruction, that uses a result of the first       │
│ instruction.                                                │
│                          520                                │
└─────────────────────────────────────────────────────────────┘
                              ↓
┌─────────────────────────────────────────────────────────────┐
│ In response to determining that the first instruction       │
│ includes an access to a memory circuit external to the      │
│ processor core, storing, by the load-store pipeline, an     │
│ indication that the first instruction accesses an external  │
│ memory location.                                            │
│                          530                                │
└─────────────────────────────────────────────────────────────┘
                              ↓
┌─────────────────────────────────────────────────────────────┐
│ In response to the indication, removing, by the execution   │
│ pipeline, the second instruction.                           │
│                          540                                │
└─────────────────────────────────────────────────────────────┘
```

```
┌─────────────────────────────────────────────────────────────────┐
│ Processing, by the execution pipeline, the second instruction   │
│ in a first stage of the execution pipeline.                     │
│                            610                                   │
└─────────────────────────────────────────────────────────────────┘
                                │
                                ▼
┌─────────────────────────────────────────────────────────────────┐
│ Identifying, in a second stage of the execution pipeline that   │
│ is performed after the first stage, that the second instruction │
│ is associated with the indication.                              │
│                            620                                   │
└─────────────────────────────────────────────────────────────────┘
                                │
                                ▼
┌─────────────────────────────────────────────────────────────────┐
│ Removing, by the execution pipeline, the second instruction     │
│ from the second stage in response to the identifying.           │
│                            630                                   │
└─────────────────────────────────────────────────────────────────┘
```

In response to the removing of the second instruction, determining that a third instruction is independent of the first and second instructions.
710

Receiving and performing, by the execution pipeline before the first instruction reaches a writeback stage, the third instruction.
720

Performing, by the execution pipeline, the second instruction in response to determining that the first instruction has reached the writeback stage.
730

REMOVAL OF DEPENDENT INSTRUCTIONS FROM AN EXECUTION PIPELINE

RELATED APPLICATION

The present application claims priority to U.S. Provisional Appl. No. 63/107,339, filed Oct. 29, 2020, the disclosure of which is incorporated by reference herein in its entirety.

BACKGROUND

Technical Field

This disclosure relates generally to memory accesses by a processor, and more particularly, to performance of instructions dependent on memory accesses.

Description of the Related Art

Computer processing circuits, or more simply processors, may fetch instructions and data from one or more memory circuits. Some memory circuits may require a longer time than others to complete a fetch request. For example, memory circuits that are external to an integrated circuit that includes the processor, such as dynamic random-access memory (DRAM), may require more time to access as compared to fetching data from an internal memory circuit that is closely coupled to the processor. To mitigate performance impacts that may result from external memory accesses, some processors include cache memories within the integrated circuit for storing fetched values, allowing the processor to reduce memory access times when re-using fetched data or instructions. When a cache miss occurs, however, performance of the processor may be impacted as instruction execution may be stalled while the processor waits for the fetched information to be returned from an external memory.

Some processors may address the delay for external memory accesses by performing the external memory accesses as non-blocking memory requests. As used herein, a "non-blocking" memory request is a type of memory access in which the non-blocking memory request is committed after the request is sent to the external memory and before the requested information is returned. Non-blocking instructions allow the processor to process subsequent instructions. If, however, a subsequent instruction is dependent on the fetched information, then the execution pipeline may be stalled until the fetched information is returned.

DETAILED DESCRIPTION

As described, an external memory access, even when processed as a non-blocking memory request, may result in a stall condition for a processor if a subsequent instruction is dependent on the result of the external memory access. In embodiments in which the processor is multithreaded (able to concurrently process instructions from two or more program threads), such a stall condition may further prevent instructions of a second thread being processed when the subsequent dependent instruction is part of a first thread, thereby reducing potential performance benefits of multithreaded processing. The inventors have recognized a benefit to removing the subsequent dependent instruction from the execution pipeline, thereby clearing the execution pipeline for instructions of a thread not associated with the external memory fetch or the subsequent dependent instruction.

In order to remove a stalled dependent instruction from an execution pipeline, the inventors propose a solution that includes, in response to determining that a first instruction includes an access to an external memory circuit, storing an indication of the external memory access in a data storage circuit. In response to the indication, a second instruction that uses a result of the first instruction is removed from the execution pipeline and may be returned to an instruction buffer. In some embodiments, a third instruction, from a different program thread for example, may be processed instead of the second instruction.

Using such a solution may increase performance of a processor by preserving in-order execution of instructions that are dependent on memory accesses with long access times, without stalling the processor pipeline of the processor. By removing dependent instructions from the pipeline, non-dependent instructions from a different program thread may be allowed to progress through the pipeline, thereby reducing a number of idle cycles within the various stages of the pipeline.

Figure 1:
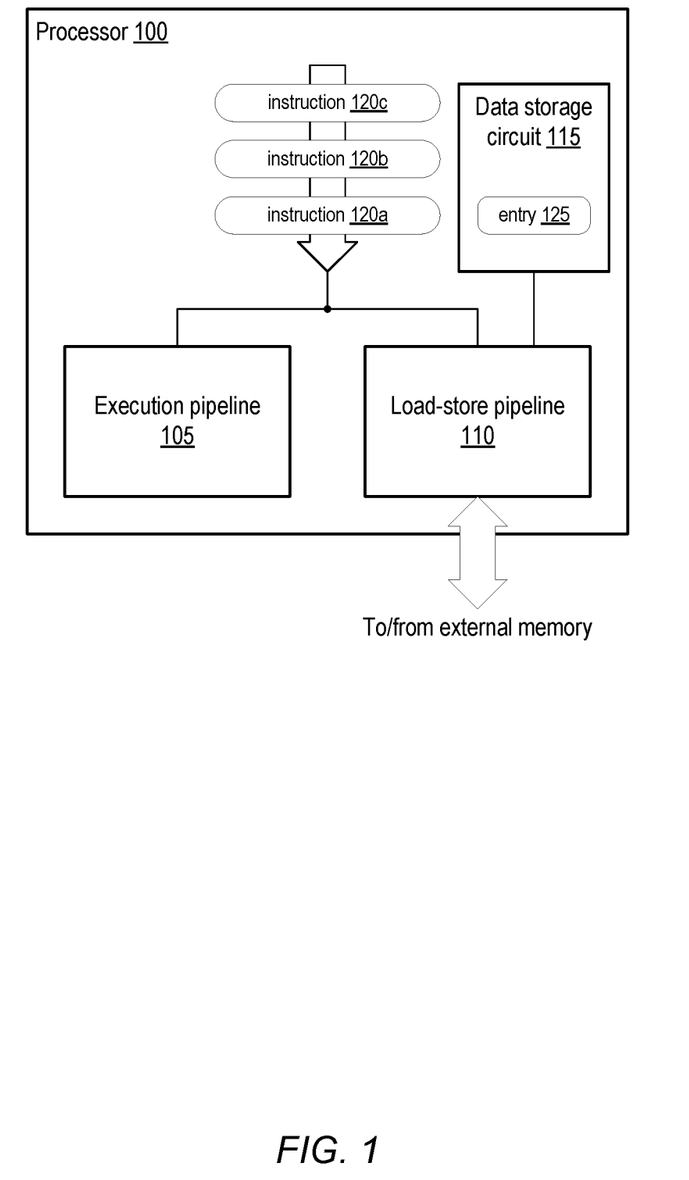
FIG. 1 illustrates a block diagram of an example processor, according to some embodiments.
Figure 2:
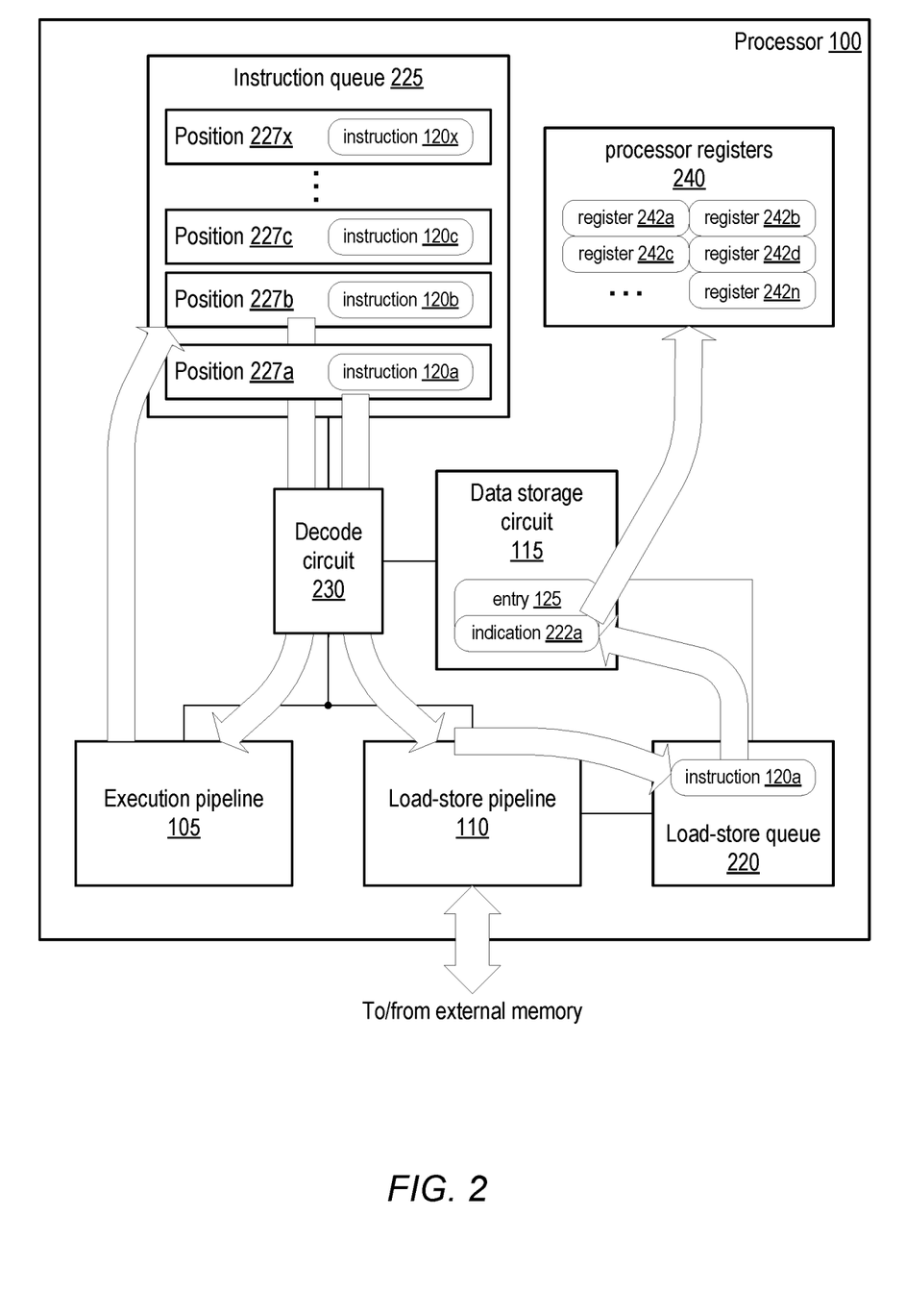
FIG. 2 shows another block diagram of an embodiment of a processor, according to some embodiments.
Figure 3:
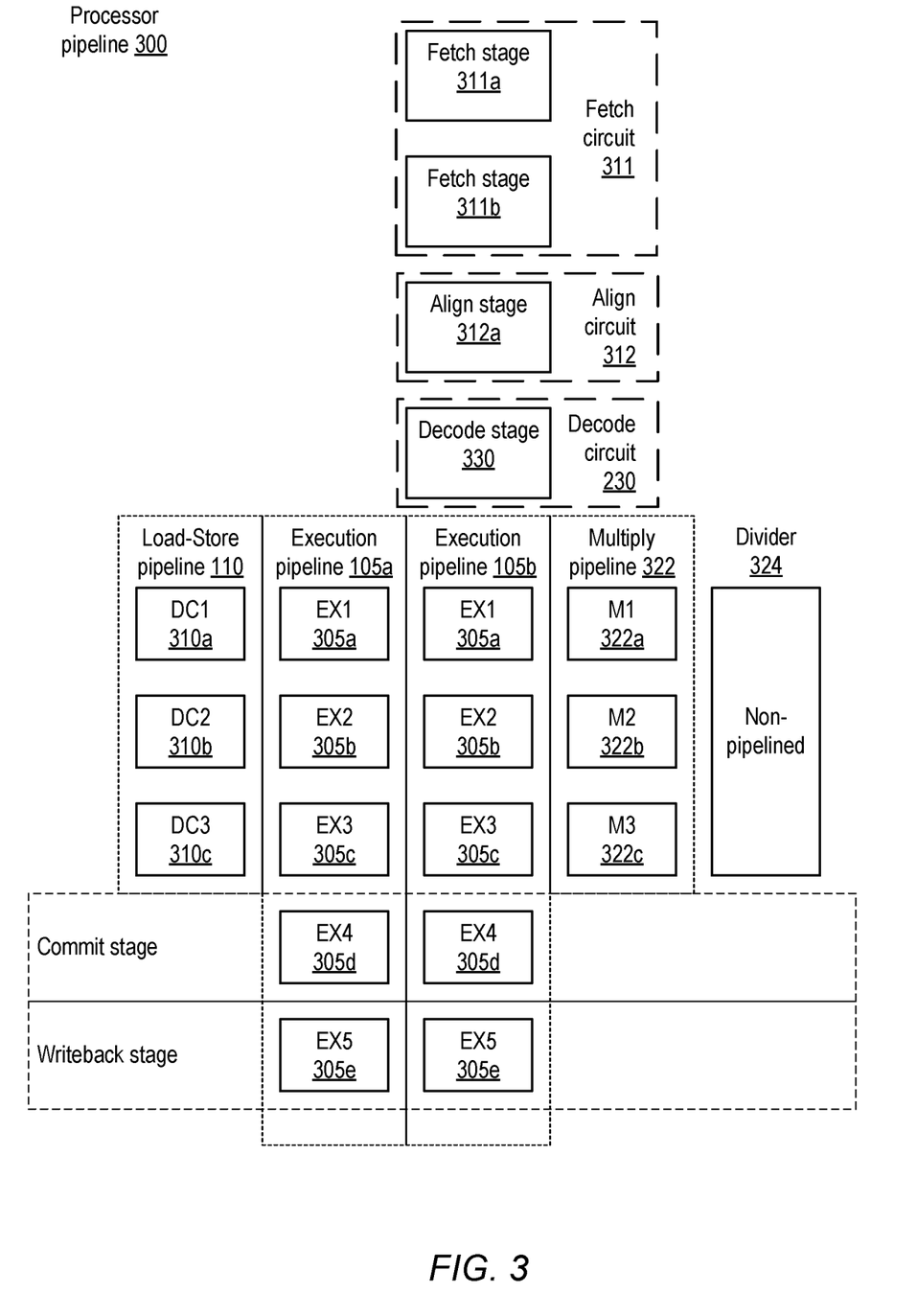
FIG. 3 depicts a block diagram of an example processor pipeline, according to some embodiments.
Figure 4:
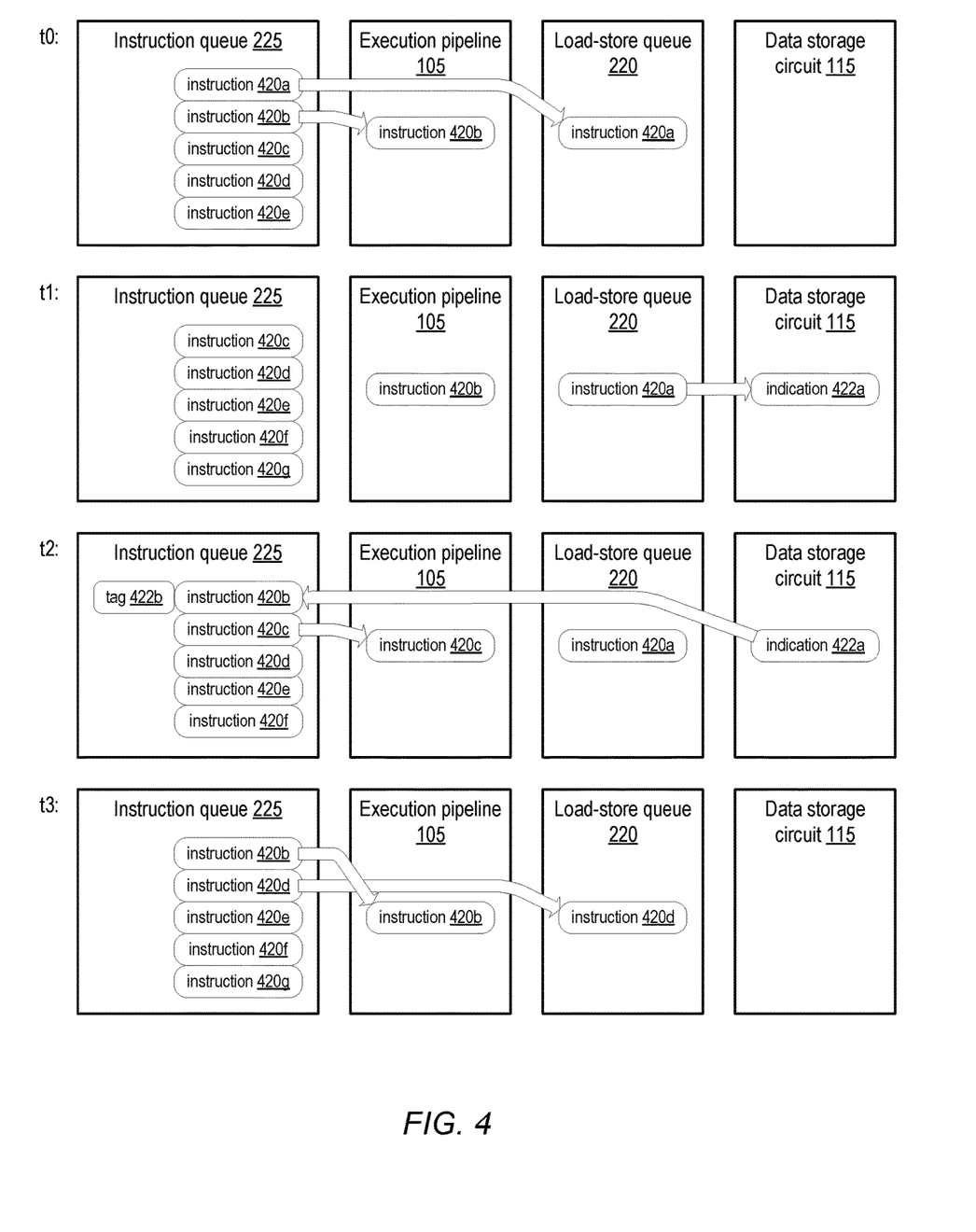
FIG. 4 illustrates a block diagram of portions of a processor at multiple points in time, according to some embodiments.
Figure 5:
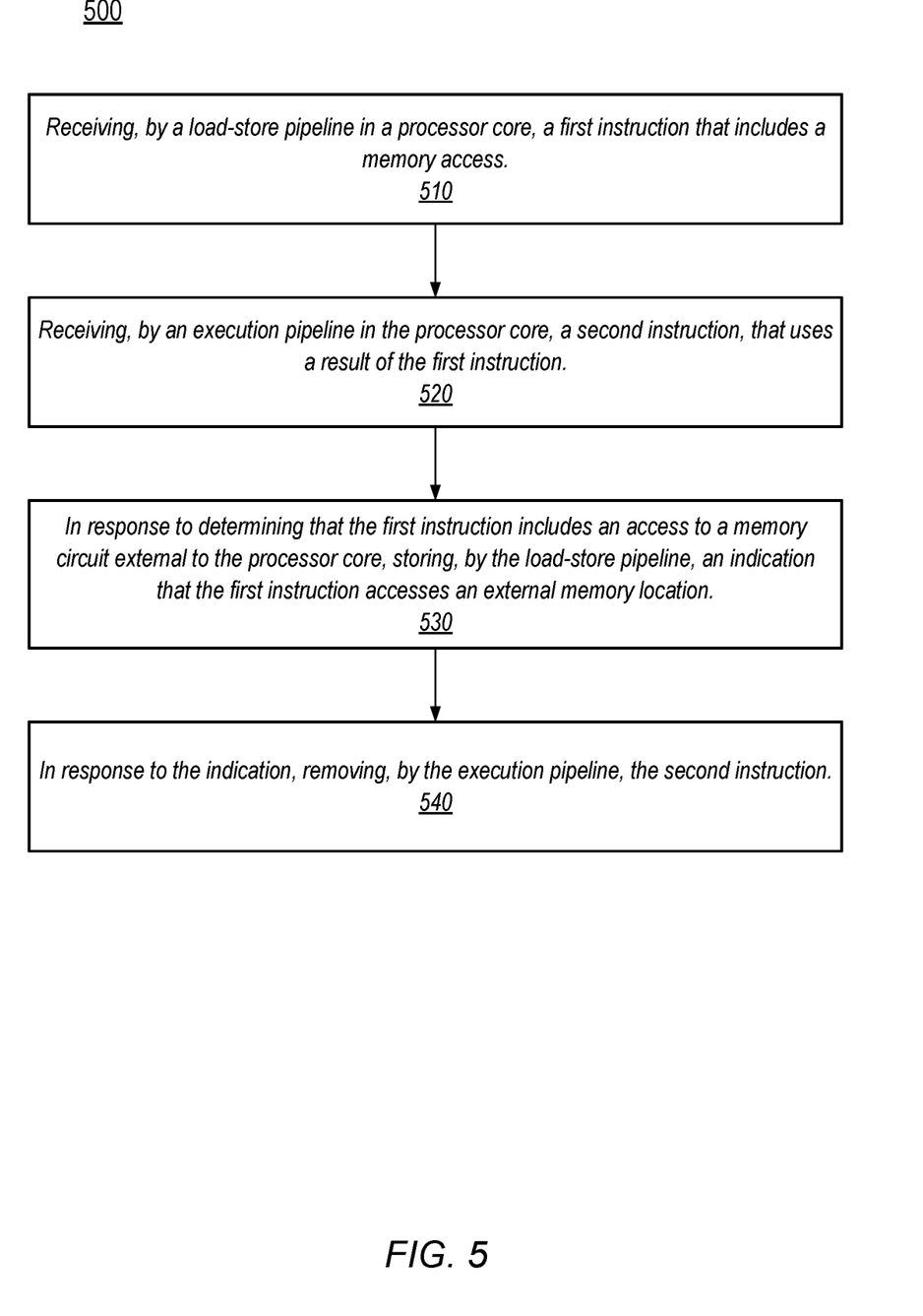
FIG. 5 is a flow diagram illustrating an example method for managing external memory accesses by a processor, according to some embodiments.
Figure 6:
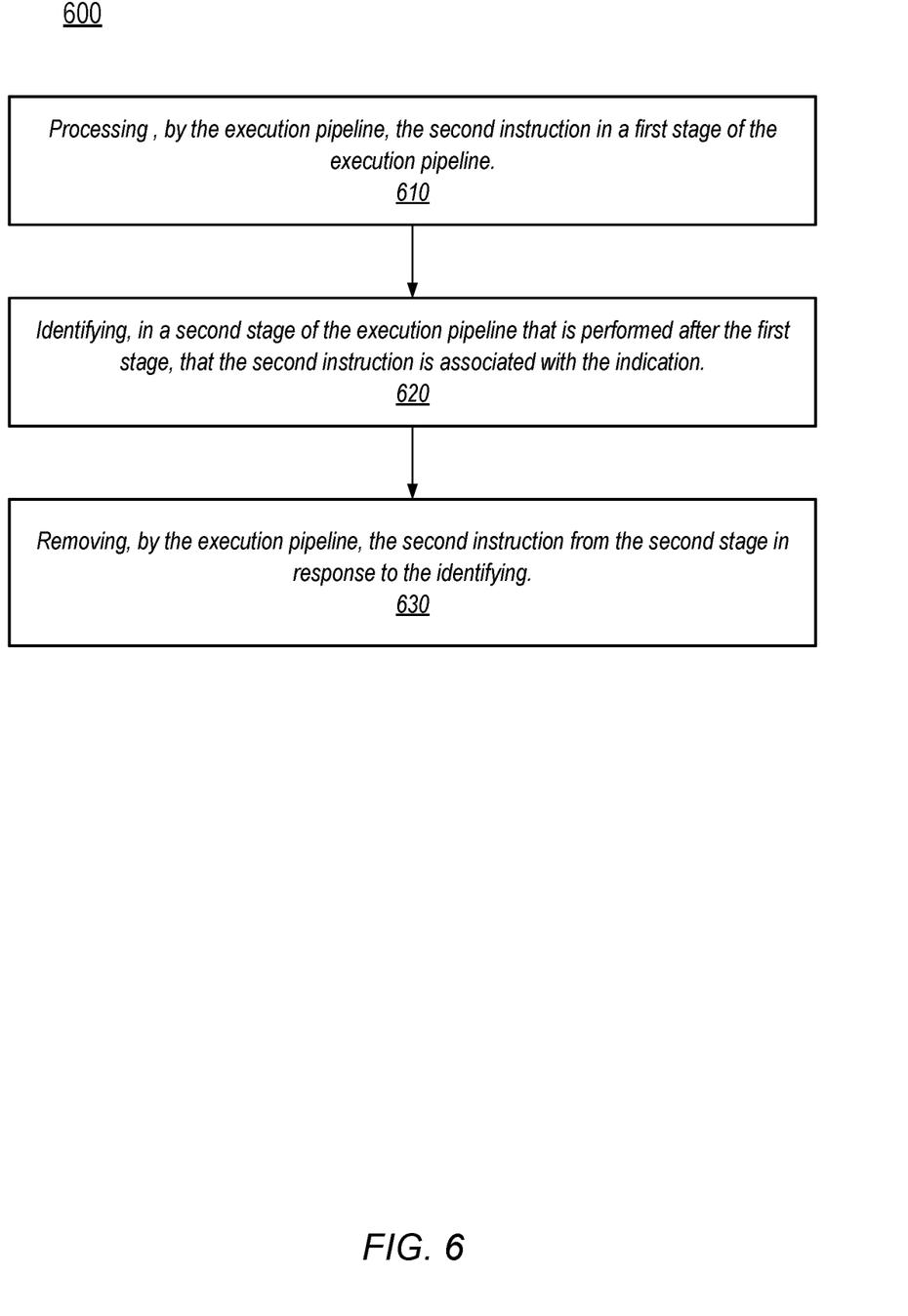
FIG. 6 shows a flow diagram illustrating an example method for removing a dependent instruction from an execution pipeline of a processor, according to some embodiments.

This disclosure initially describes, with reference to FIGS. 1-3, two embodiments of a processor and an example execution pipeline of the processor. With reference to FIG. 4 it then discloses an example flow of instructions through portions of the processor. FIG. 5 shows an example method. FIG. 6 provides an example system configuration in which the disclosed processor may be employed.

Processor Overview

An embodiment of a processor is presented in FIG. 1. Processor 100 may be used in any suitable computer system, including desktop computers, laptop computers, tablet computers, smartphones, and the like. In various embodiments, processor 100 may be implemented as a main processor in such computing systems or as a controller for one or more peripheral devices, including for example, storage devices. In some embodiments, processor 100 is configured to implement the RISC-V instruction set architecture (ISA), although other embodiments may implement other suitable ISAs. Processor 100 includes execution pipeline 105 and load-store pipeline 110, each capable of performing respective portions of received instructions 120*a*-120*c* (collectively instructions 120). Load-store pipeline 110 is coupled to data storage circuit 115.

As illustrated, processor 100 receives and queues instructions 120 to be performed, by execution units of the processor, in an order in which they are received. In some embodiments, processor 100 may support multithreaded processing, thereby allowing concurrent performance of two or more instructions from respective program threads. As shown, processor 100 includes at least two execution units, execution pipeline 105 and load-store pipeline 110.

Execution pipeline 105 may be configured to perform a portion of instructions belonging to a particular ISA, including, for example, integer and Boolean instructions, while load-store pipeline 110 is configured to perform a different portion of instructions of the ISA, including, for example, memory-access instructions such as reads and writes. Both execution pipeline 105 and load-store pipeline 110 may include several stages for processing respective ones of instructions 120, and may be capable of processing their respective instructions concurrently. These respective stages include a number of circuits configured to perform various aspects of instruction execution. Execution of an instruction through these various processing stages is referred to herein as "performing" an instruction.

It is noted that, as used herein, "concurrent" refers to events or actions that overlap in time. It is not intended to imply that such events or actions must begin and/or end simultaneously, although simultaneous occurrences are not excluded. For example, first and second instructions may be performed concurrently when the second instruction is issued to execution pipeline 105 before the first, previously-issued, instruction completes in load-store pipeline 110.

It is also noted that a "program thread" (or simply "thread"), as used herein, refers to a portion of a program or process that may be performed independently of other portions. For example, a subroutine, or portion thereof, may be identified as a thread and therefore, instructions of the thread are allowed to be processed independently and potentially concurrent with instructions from other portions.

In some cases, an integer instruction being processed in execution pipeline 105 may be dependent on a result of a read instruction being processed in load-store pipeline 110. To avoid stalling execution pipeline 105 until load-store pipeline 110 receives information being retrieved in response to the read instruction, processor 100 supports a technique for removing the integer instruction from execution pipeline 105 and then re-issuing the integer instruction once the information has been retrieved. This removal may allow other instructions to be processed in execution pipeline 105.

To implement this technique, processor 100 includes data storage circuit 115 which as shown, includes a plurality of entries. For example, data storage circuit 115 may be a content-addressable memory (CAM) capable of storing multiple bytes of data across the plurality of entries, and accessing a particular entry using data values stored in the particular entry. Load-store pipeline 110 is configured to allocate entry 125 in data storage circuit 115 in response to determining that instruction 120a includes an access to an external memory circuit. For example, load-store pipeline 110 may utilize a portion of an address included in instruction 120a, such as a number of the most significant bits of the address, in order to identify the external memory circuit.

Execution pipeline 105, as illustrated, is configured to make a determination, while performing instruction 120b and using entry 125 in data storage circuit 115, that instruction 120b uses a result of instruction 120a. For example, execution pipeline 105 may determine that a source register identified by instruction 120b corresponds to a destination register identified by instruction 120a. Execution pipeline 105 is further configured to cease performance of instruction 120b in response to the determination. Execution pipeline 105 may move instruction 120b into a register or other storage circuit that does not prevent other instructions from being performed by execution pipeline 105.

After instruction 120b is removed, execution pipeline 105 may be further configured to receive and perform instruction 120c, after determining that instruction 120c is independent of instructions 120a and 120b. For example, execution pipeline 105 may determine that operands of instruction 120c are not associated with entry 125 or other valid entries in data storage circuit 115. In some embodiments, instruction 120c may belong to a different thread than instructions 120a and 120b.

As shown, execution pipeline 105 may be further configured to perform instruction 120b in response to a determination that instruction 120a has reached a writeback stage of execution pipeline 105, or in response to a determination that data associated with instruction 120a has been received. Additional details regarding various stages of execution pipeline 105 are provided below in regards to FIG. 3. Instruction 120b is moved back into execution pipeline 105 and processed using the data retrieved by instruction 120a.

By using such a technique to identify memory-access instructions and remove subsequent instructions depending on the memory-access instruction, may increase a performance bandwidth of a processor by allowing instructions that are not dependent on the memory access or subsequent instruction to continue to be processed while the subsequent instruction waits for the result of the memory access. Execution units in the processor may be used rather than left idle, thereby potentially performing a greater number of instructions within a given amount of time.

It is noted that the processor shown in FIG. 1 is merely an example. Elements of the processor have been omitted to direct attention to disclosed concepts. Other embodiments may include additional circuit blocks, such as instruction fetch circuits and decode circuits.

Processors such as processor 100 may be implemented in a variety of fashions. In FIG. 1, processor 100 is shown with a limited number of details. Another embodiment of processor 100 is shown with additional details in FIG. 2.

Moving to FIG. 2, an embodiment of a processor 100 organized according to a particular microarchitecture is illustrated. In some embodiments, processor 100 is configured to implement the RISC-V instruction set architecture (ISA), although other embodiments may implement other suitable ISAs. As shown, processor 100 includes elements illustrated in FIG. 1 and described above, including execution pipeline 105 load-store pipeline 110, and data storage circuit 115. In addition, processor 100 includes load-store queue 220, instruction queue 225, decode circuit 230, and processor registers 240.

As illustrated, instruction queue 225 is configured to receive instructions 120 and place instructions into positions 227a through 227x within instruction queue 225, including a first position 227a and a last position 227x. Decode circuit 230 is configured to retrieve ones of instructions 120 from first position 227a, and then decode the retrieved instruction, including determining if the instruction includes any operands. Based on the decoding, decode circuit 230 issues the decoded instruction to an appropriate execution unit, such as execution pipeline 105 or load-store pipeline 110 to be performed.

When an instruction is issued to load-store pipeline 110, the instruction, as shown, is placed into load-store queue 220. Load-store pipeline 110 is configured to perform ones of instructions 120 that include memory accesses to and/or from the external memory. Since memory access, in some cases, may take multiple execution cycles, memory-access instructions are stored in an entry in load-store queue 220 while the memory access is being fulfilled. In some embodiments, multiple memory-access instructions may be sent by load-store pipeline 110 concurrently, for example, if memory locations indicated by the accesses do not overlap between instructions. Load-store queue 220 maintains a reference to memory-access instructions that have been sent, but no indication of a completion has been received by load-store pipeline 110. Such memory-access instructions may be referred to herein as "in-flight" instructions. After an indication that the access has been completed, e.g., data from a read request is received, or a value indicating a successful write is received, then the corresponding instruction may be removed from load-store queue 220.

As illustrated, processor registers 240 includes a plurality of storage circuits that may be used by instructions 120 to store operands and results of the instructions. Processor registers 240 is shown with a number of registers 242a-242n (collectively registers 242). As an example of how instructions 120 utilize registers 242, an XOR instruction may use two operands and generate one result. The two operands may include two of registers 242, or one register 242 and one value from a different memory source. The result is placed into a different one of registers 242 that is designated as the destination.

An example is presented describing how the technique disclosed above may be applied to processor 100 as shown in FIG. 2. Decode circuit 230 is configured to move, from position 227a of instruction queue 225 to load-store pipeline 110, instruction 120a that includes a memory access to a location in an external memory. Decode circuit 230 retrieves and decodes instruction 120a, thereby determining that instruction 120a accesses the external memory using, for example, a portion of an address included in instruction 120a. Since instruction 120a is a memory access, instruction 120a is dispatched to load-store pipeline 110.

After receiving instruction 120a, load-store pipeline 110 stores one or more values associated with instruction 120a in an entry in load-store queue 220. In some embodiments, a copy of instruction 120a may be stored. In other embodiments, portions of instruction 120a, e.g., a target address or a tag based on the target address may be stored along with an indication if instruction 120a is a read or write access. Load-store pipeline 110 may then send a memory request corresponding to instruction 120a to the appropriate memory circuit. In some embodiments, processor 100 may include one or more cache memories, and the memory request is sent to a memory controller to find a suitable memory circuit to use for fulfilling the memory request.

As illustrated, load-store pipeline 110 is further configured to, in response to a determination that instruction 120a causes an access to an external memory circuit, store indication 222a in data storage circuit 115. Data storage circuit 115 includes a plurality of entries, including entry 125. After determining that instruction 120a includes an access to external memory, load-store pipeline 110 places indication 222a in entry 125. Indication 222a may include an indication of the memory access location, or range of locations, of instruction 120a as well as an indication of one or more destination locations for the read data. For example, instruction 120a may indicate that one or more values read from the target locations may be stored in designated ones of registers 242. The designated ones of registers 242 may then be indicated in indication 222a. Data storage circuit 115 may, in some embodiments, be implemented as a CAM and a value included in indication 222a may be used to access indication 222a.

In some embodiments, indication 222a may be generated only for read accesses. Since read access instructions may return a result that includes read information, instructions subsequent to read access instructions may be more likely to depend on a result of a read result. A write access instruction, by comparison, may include the data to be written. If a subsequent instruction utilizes all or a portion of the write data, the write data may be available in load-store queue 220 and/or elsewhere, such as a local cache memory. Accordingly, without utilizing the disclosed techniques, a read instruction followed by a subsequent instruction dependent on the data to be read may result in a period of multiple cycles in which instructions following the dependent instruction are blocked from forward progress until a response for the read instruction is received.

After instruction 120a is retrieved by decode circuit 230, remaining instructions in instruction queue 225 may advance towards the first position, thereby resulting in instruction 120b moving into position 227a, instruction 120c into position 227b and so forth. Decode circuit 230, as illustrated, retrieves instruction 120b from position 227a and determines if instruction 120b is dependent on any in-flight instructions.

Decode circuit 230 is further configured to, in response to indication 222a, move instruction 120b, that uses a result of instruction 120a, back into instruction queue 225, for example into position 227a. In some embodiments, rather than move instruction 120b to the first position of instruction queue 225 (e.g., position 227a), a particular entry or register may be reserved for removed instructions that are dependent on other previously dispatched instructions. With instruction 120a dispatched to load-store pipeline 110 and instruction 120b moved to position 227a, decode circuit 230 may retrieve instruction 120c from position 227b.

As shown, decode circuit 230 is further configured to move, from position 227b of instruction queue 225 to execution pipeline 105, instruction 120c that is independent of instructions 120a and 120b. In order to move instruction 120c, decode circuit 230 may be further configured to determine that operands of instruction 120c are not associated with a valid indication in data storage circuit 115, including indication 222a. For example, in cases in which processor 100 supports out-of-order execution, instruction 120c could be an integer instruction such as an add instruction that adds a value in register 242c to a value in register 242b and stores the result into register 242d. Decode circuit 230 compares the operand registers 242b and 242c to valid indications in data storage circuit 115, including indication 222a, to determine if either operand of instruction 120c is included in a valid indication. If either operand matches a valid indication in data storage circuit 115, then instruction 120c may be maintained in position 227b of instruction queue 225 in a manner similar to instruction 120b. Otherwise, instruction 120c is decoded and dispatched by decode circuit 230 to execution pipeline 105. In some cases, however, instruction 120c may still be maintained in instruction queue 225 in response to determining that instruction 120c uses a result of instruction 120b.

In cases in which processor 100 supports multi-threaded operation, instruction 120c may be identified as belonging to a different thread than instructions 120a and 120b. In a similar manner as just described, decode circuit 230 may compare operand registers identified by instruction 120c to valid indications in data storage circuit 115, including indication 222a, to determine if operands of instruction 120c are included in a valid indication. If neither operand matches a valid indication in data storage circuit 115, then instruction 120c is decoded and dispatched by decode circuit 230 to execution pipeline 105. Otherwise, instruction 120c may be maintained in position 227b of instruction queue 225 in a manner similar to instruction 120b.

Instruction 120b may, in some cases, be dispatched to execution pipeline 105 before indication 222a is stored in data storage circuit 115. For example, instruction 120b may be dispatched to execution pipeline 105 in an execution cycle following right after a cycle in which instruction 120a is dispatched to load-store pipeline 110. In some embodiments, decode circuit 230 may be capable of dispatching respective instructions to execution pipeline 105 and load-store pipeline 110 in a same execution cycle. After indication 222a is stored in data storage circuit 115, execution pipeline 105 (or decode circuit 230 in other embodiments) determines that instruction 120b is in process in execution pipeline 105 but is dependent on instruction 120a in load-store pipeline 110. Although instruction 120a may have been dispatched before instruction 120b, memory accesses may take more cycles to complete than the processing of instruction 120b, and therefore, a risk of instruction 120b being processed with incorrect data exist. In response to the determination that instruction 120b is dependent on a result of instruction 120a, execution pipeline 105 is further configured to store instruction 120b in instruction queue 225 in a manner as described above.

It is noted that the processor shown in FIG. 2 is an example for demonstrating the disclosed techniques. Elements of the processor have been omitted for clarity. Other embodiments may include additional circuit blocks, such as branch prediction circuits and a data cache.

FIGS. 1 and 2 illustrate processor circuits associated with dispatching instructions to either of an execution pipeline or a load-store pipeline. Processors such as processor 100 may include additional circuits for fetching, aligning, and executing instructions. Additional details of an embodiment of processor 100 are shown in FIG. 3.

Turning now to FIG. 3, a pipeline diagram illustrating the execution timing of an embodiment of a processor pipeline is depicted. Processor pipeline 300 may, in some embodiments, correspond to processor 100 in FIGS. 1 and 2. As shown, instruction execution proceeds from top to bottom in a nine-stage pipeline, and each row of FIG. 3 represents one execution cycle. Processor pipeline 300 includes fetch circuit 311 performing fetch stages 311a and 311b, and align circuit 312 performing align stage 312a. Decode circuit 230 of FIG. 2 performs decode stage 330. Five execution circuits are shown for performing instructions of the supported ISA: execution pipelines 105a and 105b, load-store pipeline 110, multiply pipeline 322, and divider circuit 324.

As illustrated, the operation of fetch circuit 311 is split across two cycles as denoted by fetch stages 311a and 311b, during which instruction memory access occurs (e.g., to a cache, a local memory, a system memory, and the like) and fetch buffers containing unaligned fetch results are populated. A stall may occur at the fetch stage 311a stage in the event of a cache miss or line fill condition.

Operation of align circuit 312 occurs in align stage 312a. A stall may occur here in certain cases of misalignment. For example, if multiple fetch buffers need to be scanned to identify instructions to be decoded, a stall may be necessary.

Decode circuit 230 is in operation during decode stage 330. In one embodiment, decode circuit 230 attempts to identify up to two instructions that can be issued together for execution, subject to dependencies, although other embodiments may attempt to identify greater degrees of concurrency. Stalls may occur at the decode stage 330 based on dependencies, instruction synchronization requirements, or other factors.

Following decode stage 330, processing depends upon which execution circuit an instruction is routed to. Instructions destined for execution pipelines 105a or 105b enter the EX1 stage 305a of the respective pipeline. In one embodiment, execution pipelines 105a or 105b may each include two arithmetic logic units (ALUs), one of which executes at EX1 stage 305a, and the other of which executes at the EX4 stage 305d. As can be seen relative to the other execution circuit pipelines, including an ALU at EX4 stage 305d may enable forwarding of results from other execution circuits, and may prevent some instances of dependency-related stalls.

As shown, instruction commit decisions occur during EX4 stage 305d, also referred to herein as the commit stage. For example, by the end of EX4 stage 305d, all speculative conditions that would prevent an instruction result from properly being committed to architectural state (such as branch mispredictions, exceptions, interrupts, or similar conditions) should be resolved. Either invalid state will be flushed or the instruction currently at EX4 stage 305d will be permitted to modify architectural state at EX5 stage 305e, also referred to herein as the writeback stage. As used herein, an "architectural state" refers to logic states of a processor core, including registers such as condition code and other status registers and register files used for storing instruction operands and results.

Load and store instructions, as illustrated, enter DC1 stage 310a of load-store pipeline 110 and proceed to perform address generation and data cache/close-coupled memory lookup. In the illustrated case, loads and stores are effectively complete at DC3 stage 310c and can be forwarded, although they still need to proceed to the commit and writeback stages before they can be allowed to persistently modify architectural state. At a competition of the writeback stage after the architectural state has been updated based on results, a load or store instruction may be referred to as having been "written-back."

Multiply instructions enter M1 stage 322a of multiply pipeline 322. As shown, multiply pipeline 322 has similar timing to the load-store pipeline 110, with results available for forwarding at M3 stage 322c. Like load and store instructions, however, multiply instructions may proceed to the commit and writeback stages prior to persistently modifying architectural state.

In some embodiments, load-store pipeline 110 and execution pipeline 105a may be treated as a unit for instruction issue purposes. That is, during a given cycle, decode circuit 230 may issue an instruction to one of these pipelines, but not the other. Execution pipeline 105b and multiply pipeline 322 may similarly be treated as a unit, such that decode circuit 230 may issue up to two instructions per cycle for execution. In other embodiments, more aggressive issue scheduling may be implemented.

As shown, divide instructions are issued from decode circuit 230 to divider circuit 324. In the illustrated embodiment, divide operations are long-latency, unpipelined operations. For completeness, the divider path is shown in FIG. 3 as an issue path alongside the remaining execution pipelines.

It is noted that the pipeline depicted in FIG. 3 is presented as an example. Various processor pipelines are known and contemplated for use with the disclosed concepts. In other embodiments, a different number of pipeline stages and/or execution circuits may be included. For example, a multiply and accumulate execution circuit may be included in place of, or in addition to, multiply pipeline 322.

Proceeding now to FIG. 4, a block diagram depicting portions of processor 100 is illustrated at various points in time. The illustrated time line demonstrates an example of how an indication may be generated and stored in the data storage circuit 115. The portions of processor 100 that are shown include instruction queue 225, execution pipeline 105, load-store queue 220, and data storage circuit 115. Load-store pipeline 110 and decode circuit 230 are referenced but not shown for clarity.

As shown at time t0, instruction 420a is determined to be a memory-access instruction and is dispatched accordingly to load-store pipeline 110 where it may be stored in load-store queue 220 until instruction 420a has been committed and/or until instruction 420a reaches the writeback stage (e.g., EX5 305e in FIG. 3). Instruction 420b is similarly determined to be a Boolean or integer instruction for example, and is dispatched to execution pipeline 105. It is noted that, although execution pipeline 105 and load-store pipeline 110 are shown in FIG. 3 as being multistage, one instruction at a time is shown in each pipeline in FIG. 4 for clarity.

At time t1, instruction 420b remains in execution pipeline 105 and instruction 420a in load-store queue 220. Load-store pipeline 110 is further configured to, in response to a determination that instruction 420a causes an access to an external memory circuit, store indication 422a in data storage circuit 115. For example, load-store pipeline 110 may decode at least a portion of a target address for instruction 420a, the target address corresponding to the external memory circuit.

As illustrated at time t2, execution pipeline 105 is further configured to, using indication 422a, determine that instruction 420b uses a result of instruction 420a and, in response to the determination, cease performance of instruction 420b. Execution pipeline 105, or decode circuit 230 in other embodiments, moves instruction 420b back into instruction queue 225. In various embodiments, instruction 420b may be moved into first position 227a, last position 227x, or into a particular position reserved for instructions dependent on other in-flight instructions. Decode circuit 230 determines that instruction 420c is a Boolean or integer instruction and dispatches it to execution pipeline 105 to replace the removed instruction 420b.

Furthermore, decode circuit 230 is further configured to store, in instruction queue 225, a particular value (tag 422b) indicating that instruction 420b is dependent on a result of instruction 420a. In some embodiments, decode circuit 230 may be further configured to include, in tag 422b, a reference to indication 422a in data storage circuit 115. Tag 422b may, for example, include a reference to an entry in data storage circuit 115 where indication 422a is stored. In other embodiments, data storage circuit 115 may be a CAM and the reference in tag 422b may include at least a portion of the contents of indication 422a, such as a portion of a target address or a reference to a destination register associated with instruction 420a.

At time t3, as shown, instruction 420a completes and results of instruction 420a are written-back, allowing decode circuit 230 to dispatch instruction 420d to load-store pipeline 110 where it is stored in load-store queue 220. With a result of instruction 420a received and written-back to registers within processor 100, indication 422a is removed or invalidated in data storage circuit 115. Decode circuit 230 may be further configured to, in response to a determination that instruction 420a has been written-back, to move instruction 420b to execution pipeline 105. Decode circuit 230, for example, may detect the removal/invalidation of indication 422a, thereby resulting in the dispatch of instruction 420b to execution pipeline 105. In addition, decode circuit 230 may remove tag 422b from instruction queue 225.

It is noted that the timeline of events depicted in FIG. 4 are for demonstrative purpose. Variations may occur in other embodiments. For example, different combinations of instructions 420 may correspond to memory access and Boolean/integer instructions that the combination shown. Instructions may be dispatched in a different sequence due to, for example, the multiple stages of execution pipeline 105 and load-store pipeline 110.

Figure 7:
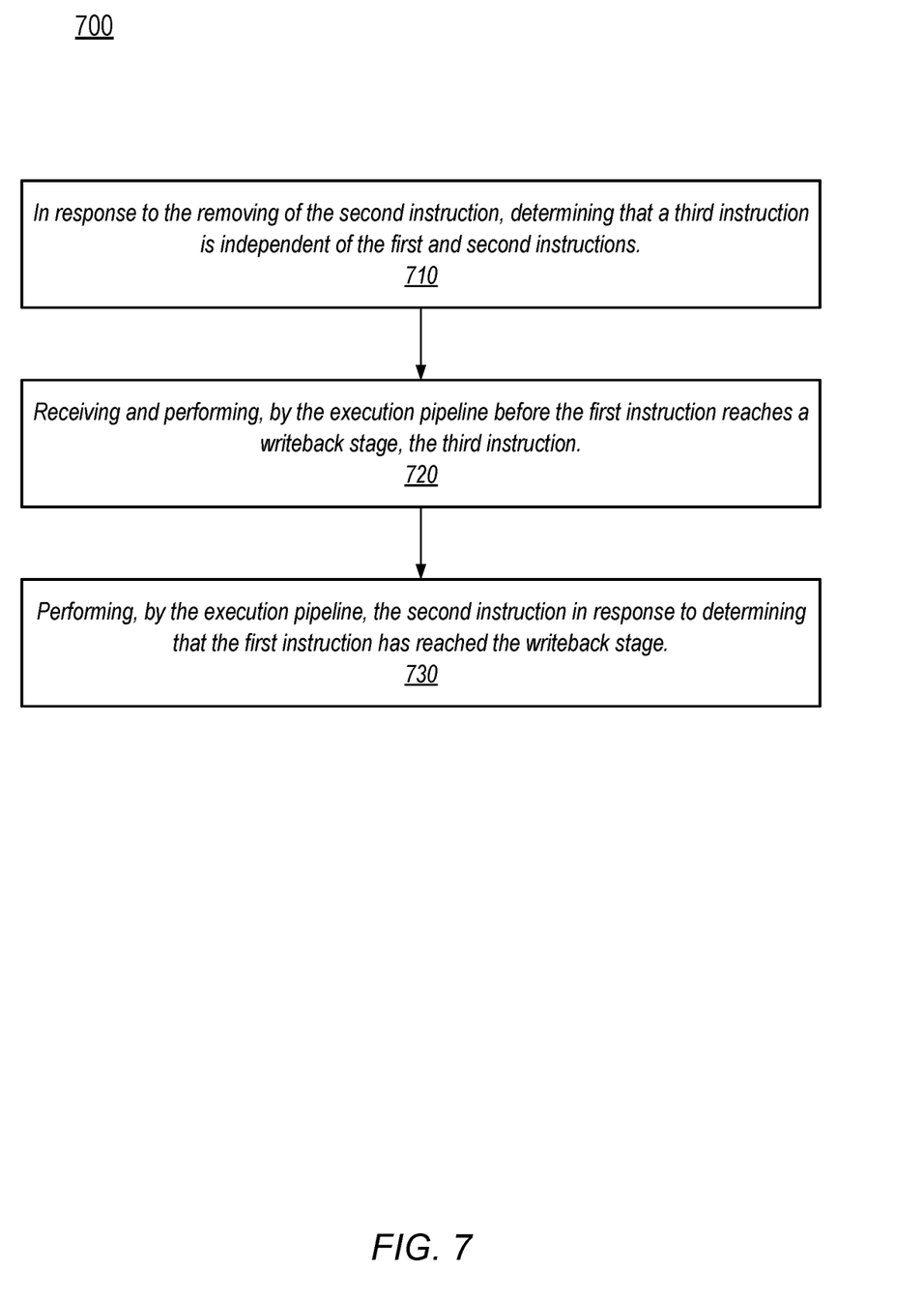
FIG. 7 is a flow diagram illustrating an example method for performing a next instruction in response to a removal of a dependent instruction, according to some embodiments.

The circuits and concepts described in FIGS. 1-4 may be implemented using various methods. In FIGS. 5-7, several methods are presented and described below.

Method for Managing Instruction Dependencies

FIG. 5 is a flow diagram illustrating a method for performing instructions in a processor pipeline, according to some embodiments. The method shown in FIG. 5 may be used in conjunction with any of the computer circuitry, systems, devices, elements, or components disclosed herein, among others. In various embodiments, some of the disclosed operations may be performed concurrently, in a different order than shown, or may be omitted. Additional operations of the method may also be performed as desired. Referring collectively to FIGS. 2 and 5, method 500 begins in block 510.

At block 510, method 500 includes receiving, by load-store pipeline 110 in processor 100, instruction 120a that includes a memory access. Instruction 120a is decoded by decode circuit 230 and is determined to include a memory access. To perform the memory access, instruction 120a is dispatched to load-store pipeline 110. In some embodiments, instructions dispatched to load-store pipeline 110 may be sent to an execution pipeline different from execution pipeline 105. For example, as shown in FIG. 3 and described above, load-store pipeline 110 may be treated as a unit with execution pipeline 105a. Decode circuit 230 may then send memory-access instructions to execution pipeline 105a and subsequent Boolean/integer instructions to execution pipeline 105b when execution pipeline 105a is unavailable due to receiving a memory-access instruction. As used herein, dispatching an instruction to a load-store pipeline includes embodiments in which the instruction is sent to the load-store pipeline as well as embodiments in which the instruction is sent to an associated execution pipeline.

Method 500 also includes, at block 520, receiving, by execution pipeline 105 in processor 100, instruction 120b, that uses a result of instruction 120a. Instruction 120b is decoded by decode circuit 230, and determined to exclude a memory access. Accordingly, instruction 120b is dispatched to execution pipeline 105.

At block 530, method 500 further includes, in response to determining that instruction 120a includes an access to a memory circuit external to processor 100, storing, by load-store pipeline 110, indication 222a that instruction 120a accesses an external memory location. As illustrated, when instruction 120a is dispatched to load-store pipeline 110, the memory access is not known to include an access to an external memory location. For example, data for a target address included in instruction 120a may be stored in a local cache or other closely-coupled memory circuit that can return the requested data in less time than fetching the data from the external memory circuit. Accordingly, instruction 120b may be dispatched to and begin processing through execution pipeline 105 while load-store pipeline 110 determines if data requested by instruction 120a can be retrieved locally. In response to determining that the requested data is not available locally, indication 222a is stored by load-store pipeline 110 in data storage circuit 115.

Method 500, at block 540, also includes, in response to indication 222a, removing, by execution pipeline 105, instruction 120b. As shown, the storing of indication 222a in entry 125 of data storage circuit 115 causes a determination whether instructions currently in-flight in execution pipeline 105 are dependent on a result of instruction 120a. For example, the storing may cause data storage circuit 115 to generate an indication that is received by execution pipeline 105, thereby causing the determination. In other embodiments, execution pipeline 105 may poll or otherwise determine if data storage circuit 115 has received a new indication. After determining, based on indication 222a, that instruction 120b is dependent on a result of instruction 120a, execution pipeline 105 clears instruction 120b from a current stage where instruction 120b is being processed. In some embodiments, instruction 120b is stored, by execution pipeline 105, in instruction queue 225 in response to indication 222a. In other embodiments, instruction 120b is placed into a register circuit configured to hold dependent instructions. The method may end or may return to block 510 to repeat for a next instruction with a memory access.

Moving now to FIG. 6, a flow diagram illustrating a method for identifying a dependent instruction being performed in an execution pipeline is shown, according to some embodiments. In a similar manner as described above, method 600 depicted in FIG. 6 may be used in combination with any of the circuits, systems, devices, elements, or components disclosed herein, among others. It is contemplated that the disclosed operations may be performed in an order other than illustrated and, in some embodiments, may include additional operations. In some embodiments, the operations of method 600 may be performed as a part of block 540 of method 500 above. Referring collectively to FIGS. 2, 3, and 6, method 600 begins in block 610, after instruction 120a has been dispatched to load-store pipeline 110 and instruction 120b has been dispatched to execution pipeline 105b.

Method 600 includes, at block 610, processing instruction 120b in a first stage of execution pipeline 105b. As shown in FIG. 3, execution pipeline 105b includes five stages, EX1 305a through EX5 305e. After receiving instruction 120b, execution pipeline 105b begins performance of the instruction in EX1 305a. Concurrently, load-store pipeline 110 determines that received instruction 120a includes a request for data that cannot be sourced locally, and therefore will be fulfilled using an access to an external memory circuit. In response to the determination, indication 222a is stored in data storage circuit 115 as previously described.

At block 520, method 600 further includes identifying, in a second stage of execution pipeline 105 that occurs after the first stage, that instruction 120b is associated with indication 222a. In a subsequent execution cycle, instruction 120b proceeds, as shown, to stage EX2 305b of execution pipeline 105b. While being processed in EX2 305b, execution pipeline 105b becomes aware of indication 222a, and determines that instruction 120b is dependent on a result of instruction 120a in-flight in load-store pipeline 110.

Method 600, at block 530, also includes removing instruction 120b from the second stage in response to the identifying. As illustrated, instruction 120b is removed from stage EX2 305b and in various embodiments, moved back into instruction queue 225 or into a different register circuit to wait until data is returned for instruction 120a. Instruction 120b is removed from execution pipeline 105b since, otherwise, instruction 120b would stall progress of any instructions subsequently dispatched to execution pipeline 105b until a result of instruction 120a is available. The method may end after operations of block 630, or may return to block 610 if a subsequent dependent instruction is received by execution pipeline 105b.

Turning now to FIG. 7, a flow diagram is shown that depicts a method for performing an instruction after a preceding dependent instruction is removed from an execution pipeline, according to some embodiments. Method 700 of FIG. 7, similar to methods 500 and 600, may be used in combination with any of the circuits, systems, devices, elements, or components disclosed herein, among others. The disclosed operations may be performed in an order other than as illustrated. In some embodiments, additional operations may be included. Operations of method 700 may, in some embodiments, be performed after operations of block 540 of method 500 are performed. Referring collectively to FIGS. 2 and 7, method 700 begins in block 710, after instruction 120b has been removed from execution pipeline 105.

At block 710, method 700 includes, in response to the removing of instruction 120b, determining that instruction 120c is independent of instructions 120a and 120b. As illustrated, instruction 120c is a next instruction in instruction queue 225 following instruction 120b. After instruction 120b is removed from execution pipeline 105, execution pipeline 105 has bandwidth to receive a next instruction. Decode circuit 230, or in other embodiments, execution pipeline 105, determines whether instruction 120c is dependent on instructions 120a and/or 120b. In one example, instruction 120c is maintained, by execution pipeline 105 and/or decode circuit 230, in instruction queue 225 in response to determining that instruction 120c uses a result of instruction 120b.

Making the determination may include, in some embodiments, determining if any operands included in instruction 120c are included as results of instructions 120a and 120b. As an example, instruction 120b may designate register 242d as a destination register for storing a result. If instruction 120c uses register 242d as an input operand, then instruction 120c is dependent on instruction 120b. Otherwise, if instruction 120c does not utilize results from instructions 120a and 120b, then instruction 120c may be dispatched to execution pipeline 105.

Method 700 further includes, at block 720, receiving and performing, by execution pipeline 105 before instruction 120a reaches a writeback stage, instruction 120c. While instruction 120a is being processed by load-store pipeline 110, execution pipeline 105 performs instruction 120c. In some embodiments, processor 100 may be a multithreaded processor and instruction 120c may be included in a different program thread than instructions 120a and 120b. In other embodiments, processor 100 may support out-of-order execution, allowing instruction 120c to proceed ahead of instruction 120b. In various embodiments, instruction 120c may be written-back before, after, or concurrently with instruction 120a.

At block 730, method 700 also includes performing, by execution pipeline 105, instruction 120b in response to determining that instruction 120a has reached the writeback stage. After data requested by instruction 120a has been received and stored in a designated destination location, instruction 120a may be committed and written-back, and indication 222a in data storage circuit 115 may be invalidated. This invalidation of indication 222a allows instruction 120b to be dispatched and processed by execution pipeline 105, in response to determining that there are no other in-flight instructions on which instruction 120b is dependent. Method 700 may end after operations of block 730 complete, or may return to block 710 in response to a different dependent instruction being removed from execution pipeline 105.

It is noted that the methods of FIGS. 5-7 are merely examples. In other embodiments, the illustrated operations may be performed in a different order and/or additional operations may be included. In some embodiments, operations of the various methods may be combined. For example, operations of method 600 may replace or be included in block 540 of method 500. Operations of method 700 may be appended to operations of method 500.

Example Computer System

Figure 8:
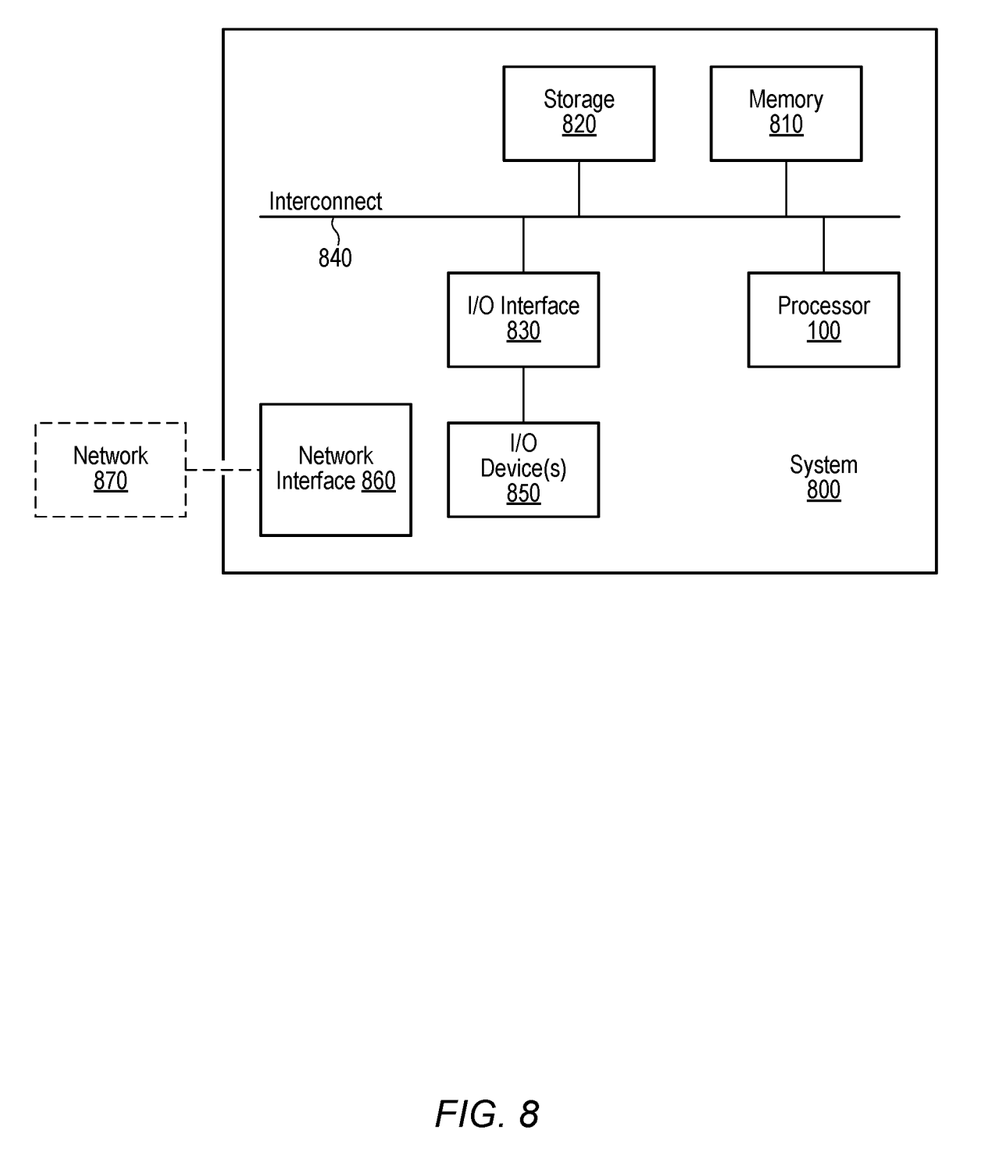
FIG. 8 is a diagram illustrating an example computing system, according to some embodiments.

Processor 100 may be included within a variety of system configurations, one example of which is shown in FIG. 8. In various embodiments, system 800 may correspond to a general-purpose computer system, such as a desktop or portable computer, a mobile phone, or the like. System 800 may also correspond to any type of embedded system that may employ one or more instances of processor 100 as a dedicated controller. For example, system 800 may correspond to any type of computer peripheral device such as a mass storage device or storage array, printer, or the like, as well as control systems for automobiles, aviation, manufacturing, and other suitable applications.

As shown, system 800 includes processor 100, memory 810, storage 820, and an input/output (I/O) device interface 830 coupled via an interconnect 840. One or more I/O devices 850 are coupled via I/O interface 830. System 800 also includes a network interface 860 that may be configured to couple system 800 to a network 870 for communications with, e.g., other systems. (In various embodiments, network interface 860 may be coupled to interconnect 840 directly, via I/O interface 830, or according to a different configuration.) It is noted that some or all of the components of system 800 may be fabricated as a system-on-a-chip, although discrete combinations of components may also be employed.

Processor 100 corresponds to one or more instances of the processor configuration described above with respect to FIGS. 1-2, or a suitable variant thereof. Memory 810 may include random-access memory (RAM) of any suitable configuration, such as working memory configured to store data and instructions usable by processor 100. Storage 820 may include mass storage devices such as magnetic, optical, or nonvolatile/flash memory storage, or a combination of these. In some embodiments, either of memory 810 or storage 820 may be omitted or integrated into the other as a single memory subsystem from the perspective of processor 100.

I/O interface 830 may be configured to interface between interconnect 840 and one or more other types of buses or interfaces. For example, interconnect 840 may correspond to the AHB interface discussed above (or another suitable type of high-bandwidth interconnect), and I/O interface 830 may be configured as a bridge device that enables coupling of different types of I/O devices to interconnect 840. I/O interface 830 may implement one or more interface protocols such as Universal Serial Bus, Firewire, or other suitable standards. I/O device(s) 850 may include any suitable type of storage, network interface, user interface, graphics processing, or other type of device. Network 870, if present, may be any suitable type of wired or wireless communications network, such as an Internet Protocol (IP) addressed local or wide-area network, a telecommunications network, or the like. Network interface 860, if present, may be configured to implement any suitable network interface protocol needed for communication with network 870.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a data storage circuit configured to store a plurality of entries and an indication including a range of memory access locations;
   a load-store pipeline configured to allocate an entry in the data storage circuit in response to a determination that the first instruction includes an access to an external memory circuit, wherein the data storage circuit is separate from and coupled to the load-store pipeline and wherein the indication is stored in the data storage circuit in response to a determination that the first instruction has already caused the access to the external memory circuit; and
   an execution pipeline configured to:
   make a determination, while performing a second instruction and using the entry in the data storage circuit, that the second instruction uses a result of the first instruction; and
   cease performance of the second instruction in response to the determination.

2. The apparatus of claim 1, wherein the execution pipeline is further configured to receive and perform a third instruction, that is independent of the first and second instructions.

3. The apparatus of claim 2, wherein to perform the third instruction, the execution pipeline is further configured to determine that operands of the third instruction are not associated with a valid entry in the data storage circuit.

4. The apparatus of claim 1, further including an instruction buffer, wherein the execution pipeline is further configured to store the second instruction in the instruction buffer in response to the determination that the second instruction uses the result of the first instruction.

5. The apparatus of claim 4, wherein the execution pipeline is further configured to: receive a third instruction from the instruction buffer; and maintain the third instruction in the instruction buffer in response to a determination that the third instruction uses a result of the second instruction.

6. The apparatus of claim 1, wherein the execution pipeline is further configured to perform the second instruction in response to a determination that the first instruction has reached a writeback stage.

7. The apparatus of claim 1, wherein the data storage circuit is a content- addressable memory (CAM) configured to access a particular entry using values stored in the particular entry.

8. A method comprising:
receiving, by a load-store pipeline in a processor core, a first instruction that includes a memory access;
receiving, by an execution pipeline in the processor core, a second instruction, that uses a result of the first instruction;
in response to determining that the first instruction includes an access to a memory circuit external to the processor core, storing, by a data storage circuit, an indication that the first instruction accesses an external memory location, wherein the indication includes a range of memory access locations, wherein the data storage circuit is separate from and coupled to the load-store pipeline and wherein the indication is stored in the data storage circuit in response to a determination that the first instruction has already caused the access to the external memory circuit; and
in response to the indication, removing, by the execution pipeline, the second instruction.

9. The method of claim 8, further comprising: receiving, by the execution pipeline after the removing of the second instruction and before the first instruction reaches a writeback stage, a third instruction; and performing, by the execution pipeline, the third instruction in response to determining that the third instruction is independent of the first and second instructions.

10. The method of claim 9, wherein performing the third instruction includes determining, by the execution pipeline, that the third instruction is not associated with the indication.

11. The method of claim 8, further comprising storing, by the execution pipeline, the second instruction in an instruction buffer in response to the indication.

12. The method of claim 11, further comprising maintaining, by the execution pipeline, a third instruction in the instruction buffer in response to determining that the third instruction uses a result of the second instruction.

13. The method of claim 8, further comprising performing, by the execution pipeline, the second instruction in response to determining that the first instruction has reached a writeback stage.

14. The method of claim 8, wherein removing the second instruction includes: processing the second instruction in a first stage of the execution pipeline;
identifying, in a second stage of the execution pipeline that is performed after the first stage, that the second instruction is associated with the indication; and removing the second instruction in response to the determining.

15. An apparatus, comprising:
an instruction queue including a first position;
a load-store pipeline configured to perform instructions that include memory accesses; and
a decode circuit configured to move, from the first position of the instruction queue to the load-store pipeline, a first instruction that includes a memory access; wherein the load-store pipeline is further configured to, in response to a determination that the first instruction causes an access to an external memory circuit, store an indication in a data storage circuit, wherein the indication includes a range of memory access locations, wherein the data storage circuit is separate from and coupled to the load-store pipeline and wherein the indication is stored in the data storage circuit in response to a determination that the first instruction has already caused the access to the external memory circuit; and
wherein the decode circuit is further configured to:
retrieve a second instruction, that uses a result of the first instruction, from the first position of the instruction queue; and
in response to the indication, move the second instruction back into the instruction queue.

16. The apparatus of claim 15, wherein the decode circuit is further configured to move, from the instruction queue to an execution pipeline, a third instruction that is independent of the first and second instructions.

17. The apparatus of claim 16, wherein to move the third instruction, the decode circuit is further configured to determine that operands of the third instruction are not associated with a valid indication in the data storage circuit.

18. The apparatus of claim 15, wherein the decode circuit is further configured to store, in the instruction queue, a particular value designating that the second instruction is dependent on the result of the first instruction.

19. The apparatus of claim 18, wherein the decode circuit is further configured to include, in the particular value, a reference to the indication in the data storage circuit.

20. The apparatus of claim 15, wherein the decode circuit is further configured, in response to a determination that the first instruction has reached a writeback stage, to move the second instruction to an execution pipeline.

* * * * *